R. B. BOHAKER.
MACHINE FOR PASTING BOXES.
APPLICATION FILED JAN. 12, 1915.
1,210,269.
Patented Dec. 26, 1916.
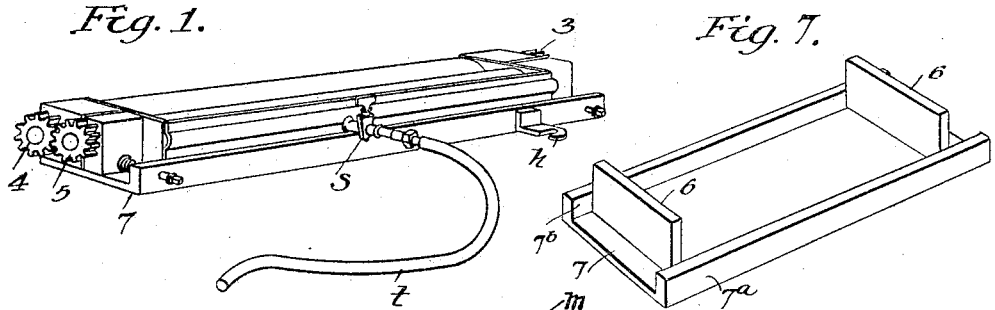
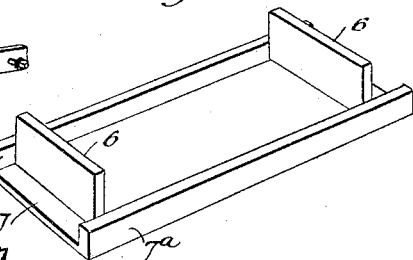
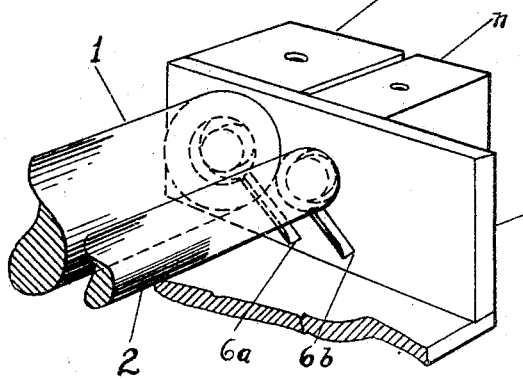
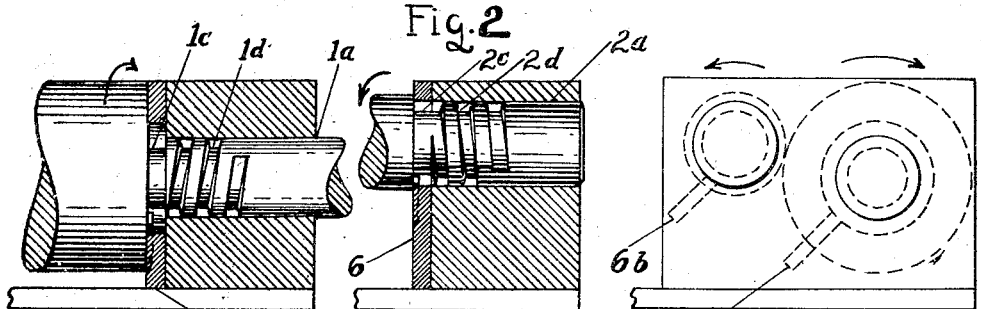
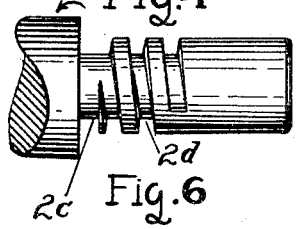
WITNESSES
INVENTOR
Richard Bumper Bohaker
By Francis V McCarthy
ATTORNEY

UNITED STATES PATENT OFFICE.

RICHARD BURPEE BOHAKER, OF LYNN, MASSACHUSETTS.

MACHINE FOR PASTING BOXES.

1,210,269. Specification of Letters Patent. Patented Dec. 26, 1916.

Application filed January 12, 1915. Serial No. 1,892.

*To all whom it may concern:*

Be it known that I, RICHARD BURPEE BOHAKER, a citizen of the United States, residing at Lynn, in the county of Essex and State of Massachusetts, have invented a new and useful Improvement in Machines for Pasting Boxes, of which the following is a specification.

My invention relates to an improvement in box pasting machines and has for its object to provide means of preventing the escape of the pasting material used in such machines, with particular relation to the escape of such material along the shafts of the pasting rolls. In the pasting machines now in use, the paste works along the shafts, causing waste, deterioration of the apparatus because of the necessity of the free use of water to overcome the clogging of the parts, by the accumulation of paste, and loss of time required for the frequent washing which is made necessary by such accumulation. By the use of my invention, all of these difficulties are overcome. My invention can be used with any of the pasting machines commonly in use.

In the drawings which accompany this application, Figure 1 is an assembled view of the pasting apparatus; Fig. 2 an inside view showing angle of channels feeding back into paste box; Figs. 3 and 4 show the bearings, grooves on ends of shafts 1 and 2, respectively, and the channels in the plates; Fig. 5 an end view shows direction of rotation as related to channels; Fig. 6 is a detached view of shaft, showing grooves; Fig. 7 is a view of the paste box.

The type of box pasting machines with which my invention is used to best advantage is the machine commonly known as the "double-ender," but I do not limit the use of my invention to this type as it may be used with other box pasting machines. For the purpose of making clear my invention, I shall confine my description to the first mentioned machine. Two cylindrical rolls, 1 and 2, are mounted on shafts $1^a$ and $2^a$ in blocks $m$, $n$. Power is applied to the larger shaft, 1, by means of a gear 3 and is transmitted from shaft 1 to shaft 2 by means of gears 4 and 5. Between the rolls and the blocks in which they are mounted are vertical plates 6. Beneath the rolls is a shallow box 7.

The paste box 7 is a metallic plate in which are set the rolls 1 and 2 on their bearings. This plate is built up on each side and the plates 6 close up the ends so that the whole comprises a shallow tray or box into which the paste is poured.

On the shaft of the rolls 1 and 2 I provide annular channels $1^c$ $2^c$. Extending along the surface of the shafts from the annular channels are spiral channels $1^d$ and $2^d$, of about two turns in length, each channel being cut in the direction shown in the drawing which accompanies this specification. Channels, $6^a$ and $6^b$ are cut in the faces of the plates 6.

T is a tube through which paste is supplied to the paste box 7 by means of gravitation or a force pump connected with power, from a containing vessel.

S is a stop cock by which the supply of paste to the paste box 7 is regulated.

H is an attaching hook by means of which the apparatus is affixed to the machine on which it is to be used.

The roll 1 is so placed that there is but a small space between it and the bottom of the paste box 7. As the roll 1 revolves, its surface passes through the paste in the paste box 7, the pressure of the rolls causes the paste to be spread along the rolls toward the plates 6 which are provided for the purpose of retaining the paste. Heretofore the shafts have been made solid, with no indentations and it has been found that the paste worked through the plates where the shafts pass through and along the shafts, thus clogging the bearings and gears and making frequent cleaning and repairing necessary. When a machine having my invention thereon is operated, the paste works its way into the annular channels and thence into the spiral channels. It is then found that the paste does not pass beyond the ends of the spiral channels but forces itself back into the paste box through the annular channels and plate channels.

I claim:

1. In a machine of the class described, rolls mounted on shafts, plates at the ends of the rolls and a paste box beneath the rolls, annular channels in the shafts, spiral channels in the shafts, channels in the plates, the annular and spiral shaft channels and plate channels being so connected and related to each other and to the paste box that, when the machine is in operation, the pasting material is prevented from escaping along the shafts and is forced back into the paste box.

2. In an apparatus of the class described, a paste box and pasting rolls, the rolls having shafts extending from each end thereof, short spiral channels in the shafts, annular channels in the shafts, vertical plates through which the shafts pass, channels in the plates, the spiral and annular channels and the plate channels being connected with each other, the spiral channels being so related to the direction of motion of the rolls that, when the apparatus is in operation, the pasting material is prevented from escaping along the shafts and is forced back into the paste box by said motion.

3. In a device for preventing the escape of pasting material from a machine of the class described, a shaft, a vertical plate with a channel in its face, a roll on the shaft, and an annular channel and a spiral channel in the shaft, the annular and spiral channels being connected with each other and the plate channel so as to comprise a continuous channel, the channels being so made that, when the machine is in operation, the spiral channel tends to force the pasting material which accumulates on the shaft toward and into the paste box of the machine through the annular channel and the plate channel.

4. In a device for preventing the escape of pasting material from a machine of the class described, a shaft, a roll on the shaft, an annular channel and a spiral channel in the shaft at each end of the roll, vertical plates at each end of the roll, channels in the plates, each annular channel and its adjacent spiral channel being so connected with each other and with its adjacent plate channel as to comprise a continuous passage, the spiral channels being so made that when the machine is in operation the spiral channels tend to force back into the paste box of the machine, through the annular channels and plate channels, any pasting material which escapes along the shaft.

5. In a device for preventing the escape of pasting material from a machine of the class described, a vertical plate, a channel in the plate, shafts, rolls on the shafts, an annular channel and a spiral channel in each shaft, the annular channel and the spiral channel being so connected with each other and the plate channel as to comprise a continuous channel for each roll, the channels being so made that, when the machine is in operation, the spiral channels tend to force the pasting material which accumulates on the shafts toward and into the paste box of the machine, through the annular channels and the plate channels.

6. In a device of the class described, shafts, rolls on the shafts, annular channels and spiral channels in the shafts at each end of the rolls, vertical plates at the ends of the rolls, channels in the plates, each annular channel being so connected with its adjacent spiral channel and plate channel as to form a continuous channel for the ends of each roll, the channels being so made that, when the machine is in operation, the spiral channels force back into the paste box of the machine through the annular channels and plate channels, any pasting material which may accumulate on the shafts.

RICHARD BURPEE BOHAKER.

Witnesses:
JAMES H. LACEY,
R. E. CHAPMAN.

Copies of this patent may be obtained for five cents each, by addressing the "Commissioner of Patents, Washington, D. C."